United States Patent [19]

Deter

[11] Patent Number: 4,754,940
[45] Date of Patent: Jul. 5, 1988

[54] EMERGENCY SUPPLY SYSTEM FOR AN AIRCRAFT CONTROL SYSTEM

[75] Inventor: Burkhard Deter, Ottobrunn, Fed. Rep. of Germany

[73] Assignee: Messerschmitt-Bölkow-Blohm GmbH, Munich, Fed. Rep. of Germany

[21] Appl. No.: 898,257

[22] Filed: Aug. 20, 1986

[30] Foreign Application Priority Data

Sep. 21, 1985 [DE] Fed. Rep. of Germany ....... 3533720

[51] Int. Cl.⁴ ............................................. B64C 13/42
[52] U.S. Cl. .................................... 244/75 R; 244/78; 91/510; 60/911
[58] Field of Search ............ 244/226, 227, 228, 75 R, 244/78, 76 R; 91/509, 510; 60/403, 404, 911

[56] References Cited

U.S. PATENT DOCUMENTS

| | | | |
|---|---|---|---|
| 2,616,264 | 11/1952 | Grant et al. | 244/226 |
| 2,619,304 | 11/1952 | Feeny et al. | 244/226 |
| 2,977,071 | 3/1961 | Plotkowiak et al. | 244/58 |
| 3,315,085 | 4/1967 | Mileti et al. | 60/404 |
| 3,877,346 | 4/1975 | Koopmann et al. | 60/403 |

FOREIGN PATENT DOCUMENTS

3111722 10/1982 Fed. Rep. of Germany .

OTHER PUBLICATIONS

Oelhydraulik und Pneumatik 10 (1966), No. 1, pp. 10–14.

Primary Examiner—Joseph F. Peters, Jr.
Assistant Examiner—Rodney Corl
Attorney, Agent, or Firm—Kenyon & Kenyon

[57] ABSTRACT

An emergency supply system for maintaining the emergency flight control of a high-performance aircraft of aerodynamically unstable design having three energy systems, namely, two identical hydraulic systems, connected in parallel for redundancy, for actuation of the control surfaces of the aircraft required for its ability to fly, and an electric on-board system having at least one generator, a rechargeable battery and a non-rechargeable emergency battery, the three energy systems being interconnectible in terms of energy by a power transmission unit, and wherein the two hydraulic systems are divided into subsystems associated with single or several rudder functions which, if necessary, can be disconnected singly.

5 Claims, 4 Drawing Sheets

EMERGENCY SUPPLY SYSTEM FOR AN AIRCRAFT CONTROL SYSTEM

BACKGROUND OF THE INVENTION

The present invention relates to an emergency supply system for an emergency flight control of a high performance aircraft of unstable design and to a power transmission unit for such an emergency supply system.

The draft designs of single-seat or two-seat fighter planes for the near future (e.g., the Hunter 90) focus on improvement of the flying properties (maneuverability, climbing ability, slow flight, etc.). Apart from the choice of propulsion mechanism and material (e.g., composite fiber materials) the aerodynamic concept is of great importance, the trend being toward the so-called canard type with aerodynamically unstable design. The canard type has numerous control surfaces specifically with a view to mobility, but this requires a voluminous drive system with the disadvantage of great vulnerability. Also with a view to great mobility, the lift and control surfaces are arranged, in consideration of the center of gravity of the aircraft, in such a way that the aircraft acts in an aerodynamically unstable manner.

So that it will nevertheless remain easy to control by the pilot, it must be artificially restabilized by appropriate control systems, the vulnerability being increased, of course, by these systems also. Now in order to achieve a flying safety comparable with simpler designs despite the greater vulnerability, at least the energy systems required for emergency flight control must be as failure-proof as possible. This involves the electric on-board system for power generation/transmission as well as for the transmission of control commands, measuring and regulating signals, etc., and one or more hydraulic systems for the direct actuation of the control surfaces. A common measure, which serves not only for power increase but also for safety, is the installation of two propulsion mechanisms. Each engine then has its own equipment carrier, so that at least the drive groups for the hydraulic system (pump) and for the electric system (generator) are provided in duplicate (redundance). Known also is the provision of engine-independent turbines, which in an emergency are admitted with propulsion gases by a decomposition of a single-component fuel (e.g., hydrazine), these turbines serving to restart the engines or directly for the - brief - drive of important groups. Such single-component fuel systems are, however, cost-intensive, expensive and not quite without danger. There is no problem with the installation of non-rechargeable expendable batteries, which for several minutes can deliver a relatively high power. In modern two-jet fighter planes already in use, with two mutually independent hydraulic systems, it is known practice to actuate the control surfaces required for emergency flight control simultaneously with both hydraulic systems (parallel systems). To be able to transmit power from one hydraulic system to the other also directly, a power transmission unit is installed, which consists of two hydraulic pumps/motors with input/output shafts coupled together, so that one group can be operated as a motor, the other as a pump. This power transmission unit can be coupled in and out via 2/2 distributing valves. In addition, there are several emergency hydraulic pumps which can be driven selectively via a hydraulic drive or via an electric motor for each. These pumps, motors and single-component fuel systems - provided in addition to the power transmission unit and the main hydraulic pumps - are expensive and cost-intensive and in normal flight are only a heavy, useless ballast.

It is known from DEP 31 11 722 to provide various engine-indepedent energy sources, for example, a relative wind turbine, which drives one generator and one hydraulic pump. The possibility has also been mentioned, of driving a generator and a pump with an additional accessory gas turbine and supplying an electric motor from a battery, which, in turn, drives a pump. Additional groups of this nature, intended exclusively for emergency operations, undoubtedly increase the degree of fail-safety. Under normal operating conditions they are, however, only additional ballast and increase the difficulty and expense of maintaining the aircraft.

In terms of electric energy sources it should be stated that, aside from engine-dependent and engine-independent generators, rechargeable accumulators as well as non-rechargeable emergency batteries are used. Known hydraulic systems are described in the Greman Magazine "Oelhydraulik und Pneumatik" 10 (1966) Nr. 1. pages 10 to 14. According to this reference, it is customary with modern transport aircraft, to provide for all important functions two parallel-connected essentially identical hydraulic systems, which under normal operating conditions operate together, but which, however, are layed out in such a way, that in an emergency, one system suffices for operating the craft, with the operating processes in view of the reduced power, proceeding, for example, only at half the speed. The two hydraulic systems can be entirely separated from each other. They can, however, also be connected in terms of energy, for example, with a connection valve. Also, the hydraulic systems can be coupled to the electric on-board system by providing in each of the hydraulic systems, in addition to the engine-driven pump, an accessory pump with electromotor drive for emergencies. Moreover, each of the two hydraulic systems can be divided into two or more subsystems, connected in series and via an excess pressure valve. In doing this, the less important secondary subsystem is supplied with pressure oil only when in the more important primary subsystem the full oil pressure decreases. In case of leaks in the primary subsystem the secondary subsystem remains non-operational. The rudder functions are, corresponding to their degree of importance to the ability to fly, assigned to the subsystems.

In summary, it can be stated that the known systems permit in emergencies the supply of power to the hydraulic systems, between the hydraulic systems as well as to the electric on-board system, for which engine-dependent and independent energy sources are considered. In order to do this, relatively expensive, heavy, and maintenance-intensive accessory groups are required, which reduce the payload of the aircraft.

SUMMARY OF THE INVENTION

As distinguished therefrom, it is an object of the present invention to provide a simpler, lighter and cheaper emergency supply system, which makes use exclusively of electric and hydraulic energy and clearly increases the safety in emergency flight operation.

Further, it is an object of the invention to increase the possibilities for power transmision as well as through selective avoidance of transmission losses to increase significantly the flight operation safety in emergencies while applying few, small, lightweight, cost-effective, and reliable accessory units.

Further, an object of the invention is to provide a compact, reliable power transmission unit which is composed exclusively of time-tested, commercial components.

The above and other objects of the present invention are acheived by an emergency supply system for maintaining the emergency flight control of a high-performance aircraft of aerodynamically unstable design having two substantially identical parallel-connected hydraulic systems for actuating the control surfaces of the aircraft required for flight, the hydraulic systems under normal operating conditions being supplied with energy by two independent hydraulic pumps operated by the propulsion system of the aircraft, each hydraulic system being divided into at least two subsystems assigned to at least one rudder function of the aircraft and being interconnectable in terms of energy by a power transmission unit, the system further having an electric on-board energy system, three different electric energy sources being provided in the electric on-board energy system comprising at least one propulsion system driven generator, at least one rechargeable battery, and at least one non-rechargeable emergency battery, the power transmission unit allowing power from each of the three electric energy sources to be supplied to the two hydraulic systems, and further allowing power from each of the two hydraulic systems to be transmitted to the electric on-board system for recharging the rechargeable battery and providing power to other electric power using devices, the subsystems having the ability to be selectively connected and disconnected by the power transmission unit.

Due to the invention it is possible to supply power from all energy sources (generator, accumulator, battery) of the on-board electric systems to the hydraulic systems as well as power from both hydraulic systems to the electric on-board system, either for the direct supply of electric power users or for recharging the batteries. Due to the possibility of selectively coupling out damaged subsystems of the hydraulic systems, for example, after being hit, dangerous power transmission losses are largely avoided.

The constructional core of the invention is the relatively compact, simple, and lightweight power transmission unit comprising, in a preferred embodiment, two hydraulic pumps/motors and one direct current motor/generator. By combining operating modes-motor/pump, motor/generator-the power transmission possibilities according to the invention are the result.

BRIEF DESCRIPTION OF THE DRAWINGS

The invention will be described in greater detail in the following description with reference to the drawings, in which.

DETAILED DESCRIPTION

Figure 1:
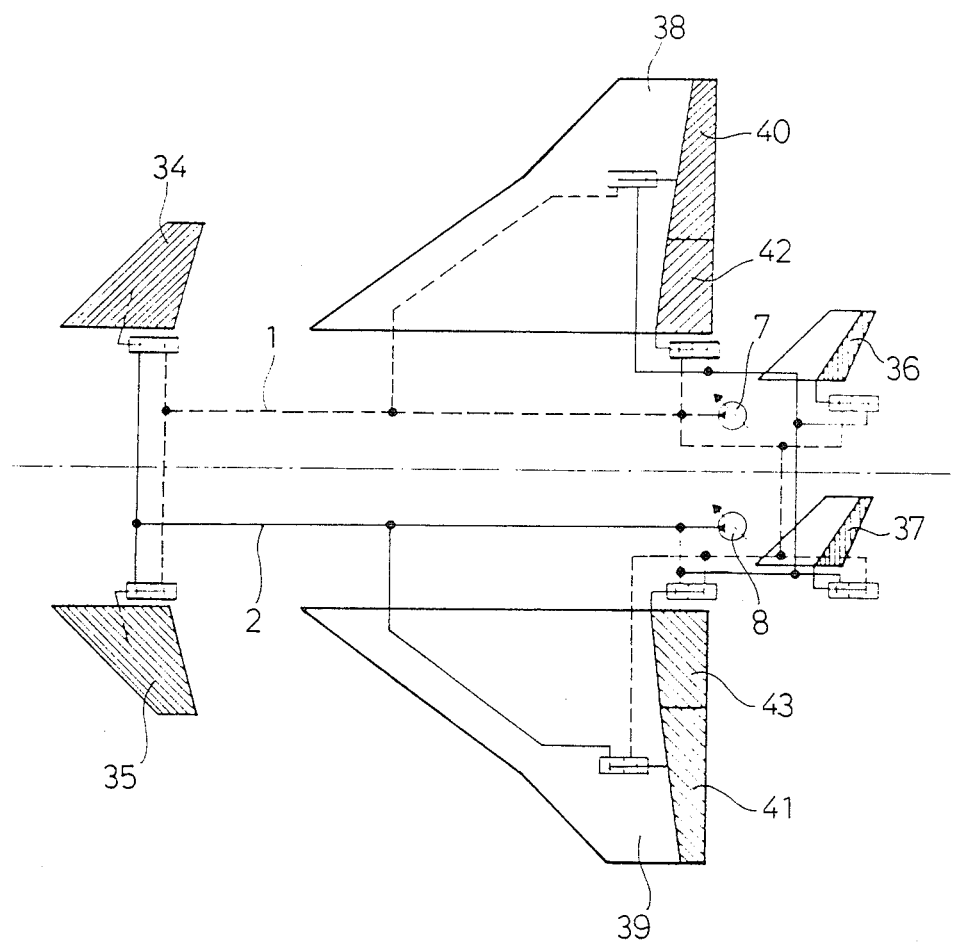
FIG. 1 shows the control surfaces required for emergency flight control, as well as parts of the hydraulic system.

With reference to the drawings, the areas shown hatched in FIG. 1 represent those control surfaces which in emergency flight operation must still be operable. Specifically this involves the canard wings 34 and 35 farthest forward in flight direction, the outer ailerons 40 and 41 and inner ailerons 42 and 43, articulated to the wings 38 and 39, and the two vertical rudders 36 and 37. It can be seen also that the actuating elements (e.g., hydraulic cylinders) of these control surfaces are connected both to the first hydraulic system 1 shown in broken lines and to the second hydraulic system 2 shown in solid lines. The two hydraulic systems 1 and 2 are each fed by an adjustable hydraulic pump 7 and 8.

Figure 2:
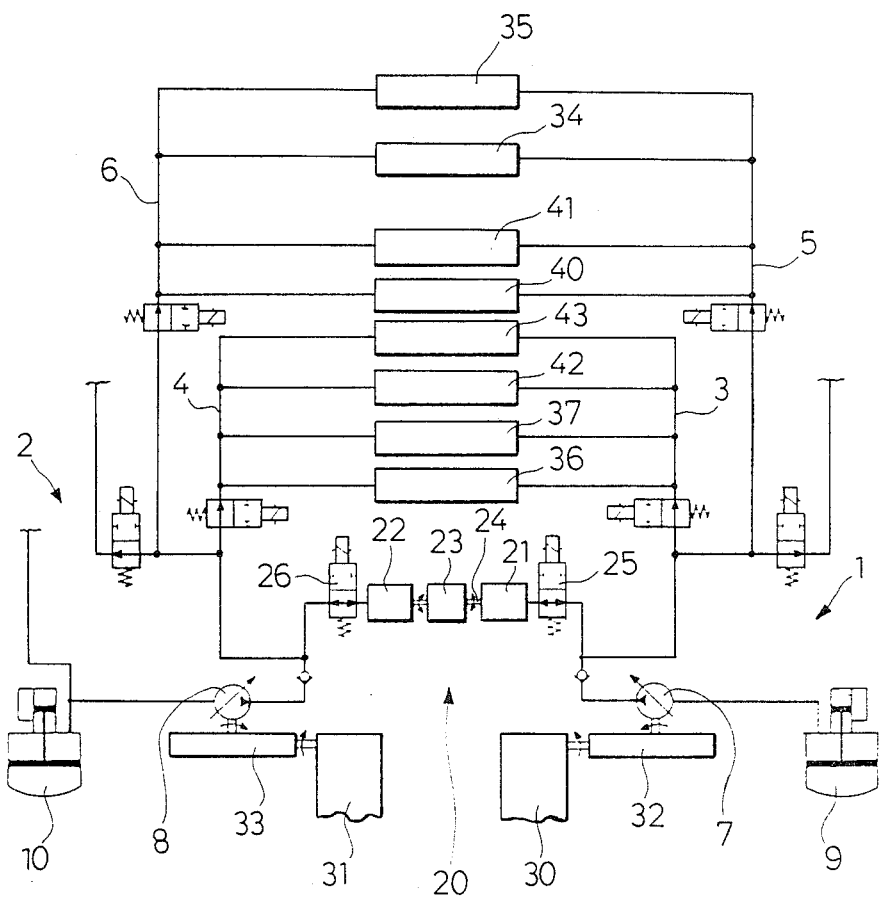
FIG. 2 shows the correlation of the subsystems of the two hydraulic systems with the control surfaces according to FIG. 1, as well as the arrangement of the power transmission unit.
Figure 3:
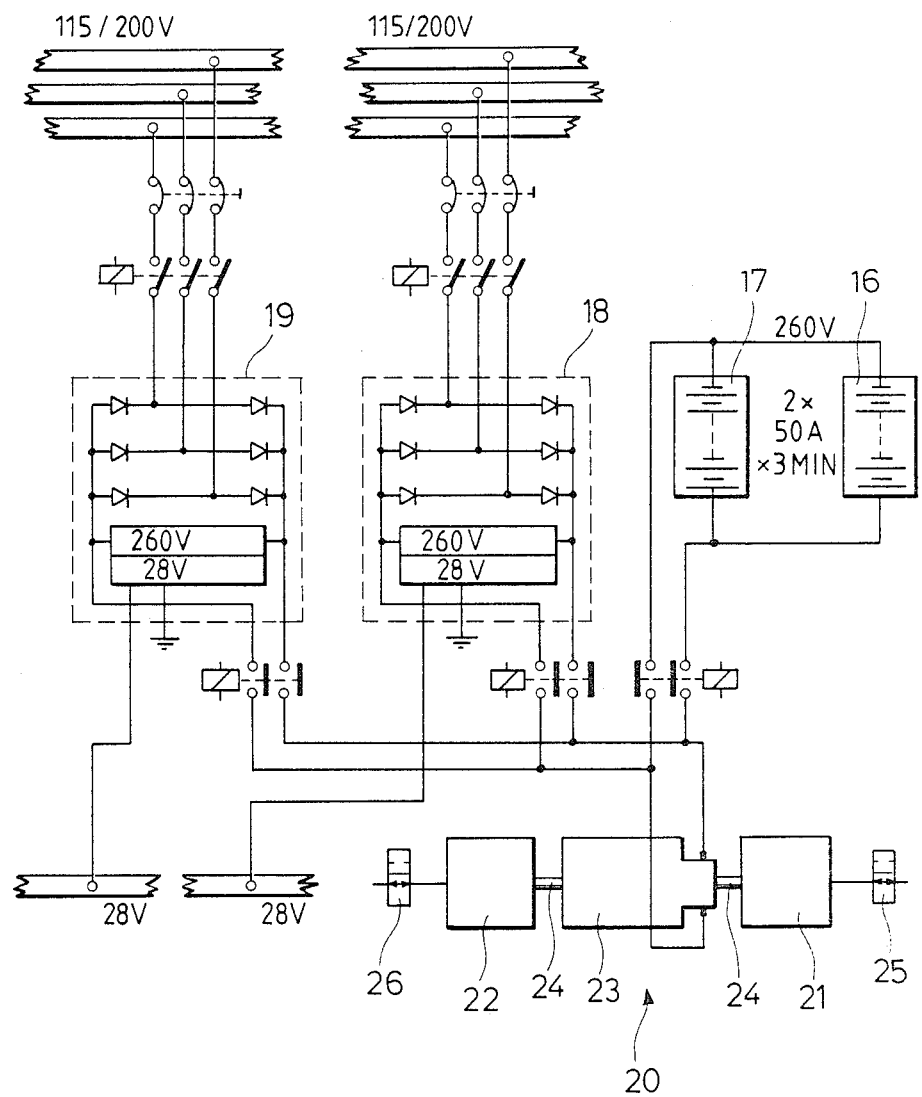
FIG. 3 shows parts of the electric on-board system in conjunction with the coupling of the power transmission unit.

As can be seen in FIG. 2, the hydraulic pumps 7 and 8 are driven by the propulsion mechanics (engines) 30 and 31 via the equipment carriers 32 and 33. The pumps draw the oil out of the hydraulic oil tanks 9 and 10 and convey it via 2/2 distributing values into the respective subsystems 3 and 5 and, respectively, 4 and 6. Those line branches which do not serve for emergency flight control are only indicated as to their points of origin. The line system for the oil return to the hydraulic oil tanks 9 and 10 has also not been represented for the sake of clarity. Each hydraulic system 1 and 2 is split into two subsystems, 3, 4 and 5, 6, respectively, which can be connected and disconnected as needed. The parallel subsystems 3 and 4 actuate the vertical rudders 36 and 37 as well as the inner ailerons 42 and 43, while the subsystems 5 and 6, also connected in parallel, actuate the outer ailerons 40 and 41 as well as the canard wings 34 and 35. In the region between the hydraulic pumps 7 and 8 and the branching into the subsystems, the two hydraulic systems 1 and 2 can be hydromechanically coupled via the power transmission unit 20. The connecting and disconnecting of the hydraulic pumps/motors 21 and 22 occurs via the 2/2 distributing valves 25 and 26. The energy connection to the electric on-board system 11 is additionally possible through the d-c motor/generator 23 disposed on the common input/output shaft 24 of the hydraulic pumps/motors 21 and 22. The power transmission unit 20 - including the 2/2 distributing valves 25 and 26 -is illustrated also in FIG. 3; this figure is intended to show an embodiment for connecting the d-c motor generator 23 with the electric on-board system 11. For reasons of weight (small winding cross sections), the d-c motor/generator 23 operates with a high d-c voltage of 260 V. For power transmission into one of the two hydraulic systems 1 or 2 the d-c motor/generator 23 can be fed for about 3 minutes by the non-rechargeable emergency batteries 16 and 17 which produce 260V d-c voltage. This is the case that occurs when both engines 30 and 31 fail - for example as a result of extreme flight maneuvers - and thus neither the hydraulic pumps 7 and 8 nor the generators 12 and 13 function. The time of 3 minutes must then suffice to restart the engines. If the hydraulic pumps 7 and 8 fail but at least one of the generators 12 or 13 is still functioning, there is still another possibility of transmitting power from the electric on-board system 11 into one of the hydraulic systems 1 or 2. To this end, the three-phase voltage of 115/200V generated by the generators 12 and/or 13 is transformed by means of the transformer/rectifier units 18 and/or 19 into a d-c voltage of 260V and supplied to the d-c motor/generator 23. The three-phase current buses (115/200V) are represented in FIG. 3 through the transformer/rectifier units 18 and 19. In the units 18 and 19, diodes are used for rectification; the switches/contactors not specifically designated are of conventional construction and merely point to the various circuit possibilities.

Figure 4:
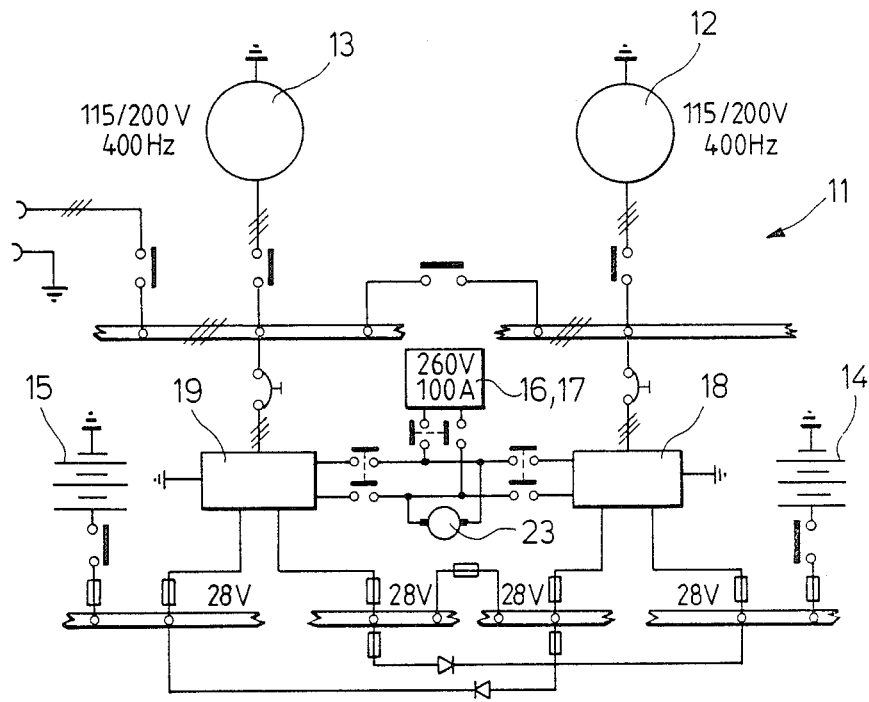
FIG. 4 shows the essential elements of the electric on-board system for energy generation, storage and transmission.

Furthermore, it is possible to transmit power from the hydraulic systems 1 and 2 into the electric on-board system 11. Here at least one of the hydraulic pumps/motors 21 and 22 serves as the drive group for the d-c motor/generator 23 operating as generator. Since, inter alia, the rechargeable batteries 14 and 15 (FIG. 4) operate at a voltage of only 28V, the generated d-c voltage of 260V must be transformed to this low value in one of the transformer/rectifier units 18 or 19. The d-c voltage buses (28V) are shown in FIG. 3 to the left of the power transmission unit 20. FIG. 4 lastly shows all essential energy generating, storing and transmitting elements of the electric on-board system 11, the three-phase current areas being marked with three parallel slanting lines. At the top of the illustration, the two generators 12 and 13 (115/200V, 400 Hz) are shown. They deliver their three-phase voltage to the two transformer/rectifier units 18 and 19 shown vertically therebelow. Of these, then, for example the batteries 14 and 15 are charged across the d-c voltage buses (28V) shown at the very bottom of the illustration. Approximately in the center of the picture the emergency batteries 16, 17 are combined in one symbol (260V, 100 A). Below it, lastly, the d-c motor/generator 23 is shown.

Thus, despite simple construction, the emergency supply system according to the invention offers a hitherto unknown multiplicity of system-connecting power transmission possibilities. According to calculations, the immunity to failure of the hydraulic emergency supply is thereby increased by a factor of 3.8 against a system without a power transmission unit. The estimated additional weight for the power transmission unit, for the emergency batteries, for lines, cabling, control equipment, switches, etc. amounts to about 55 to 75 kg and thus is readily acceptable, in relation to the attainable advantages of the system.

Thus, there has been described an emergency supply system for maintaining the emergency flight control of a high performance aircraft of aerodynamically unstable design having three energy systems, the energy systems comprising two substantially identical hydraulic systems connected in parallel for redundancy, for actuation of the control surfaces of the aircraft required for flight and an electric on-board system. The energy systems are interconnectable in terms of energy by a power transmission unit, thus providing for the necessary redundancy. If one of the on-board systems fails, it can be supplied from at least one of the still intact on-board systems with lower power as compared to normal operation. The failed system must be supplied with lower power because the intact system must then supply power not only for itself, but for also the failed system.

In the case of power transmission from the electric on-board system into one of the hydraulic systems, the one hydraulic system into which power is transferred may be operated with only about 50% of the normal power, for example.

With respect to the hydraulic pumps 7 and 8 of the system, these hydraulic pumps may comprise axial piston pumps having control by swash plates which can be pivoted continuously from a zero delivery position perpendicular to the input/output shaft about an axis intersecting the input/output shaft at right angles to both sides, for flow control and selection of the mode of operation. Furthermore, the d-c motor/generator may comprise an adjustable shunt motor/generator with collector.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An emergency supply system for maintaining the emergency flight control of a high-performance aircraft of aerodynamically unstable design comprising two substantially identical parallel-connected hydraulic systems for actuating the control surfaces of the aircraft required for flight, the hydraulic systems under normal operating conditions being supplied with energy by two independent hydraulic pumps operatively connected to the propulsion system of the aircraft, each hydraulic system including at least two subsystems operatively connected to at least one rudder of the aircraft and being interconnectable in terms of energy by a power transmission unit, the supply system further comprising an electric on-board energy system, three different electric energy sources being provided in the electric on-board energy system comprising at least one propulsion system driven generator, at least one rechargeable battery, and at least one non-rechargeable emergency battery, the power transmission unit operatively connected to each of the three electric energy sources such that power therefrom may be supplied to the two hydraulic systems, and further allowing power from each of the two hydraulic systems to be transmitted to the electric on-board system for recharging the rechargeable battery and providing power to other electric power using devices, said subsystems including means enabling them selectively connected and disconnected by said power transmission unit.

2. The emergency supply system recited in claim 1, wherein the power transmission unit comprises a hydraulic pump for each hydraulic system, said hydraulic pump being selectively operated as a hydraulic motor, further comprising a d-c motor/generator for the electric on-board system, said hydraulic pumps operable in pump and motor operation and said motor/generator operable in motor and generator operation, each with the same direction of rotation and being connected by a common input/output shaft, the d-c motor/generator being arranged between the hydraulic pumps.

3. The emergency supply system recited in claim 2, wherein the hydraulic pumps comprise axial piston pumps having control by swash plates which can be pivoted continuously from a zero delivery position perpendicular to the input/output shaft about an axis intersecting the input/output shaft at right angles to both sides, for flow control and selection of the mode of operation.

4. The emergency supply system recited in claim 2, further comprising a 2/2 distributing valve assigned to each of the hydraulic pumps.

5. The emergency supply system recited in claim 2 wherein the d-c motor/generator comprises an adjustable shunt motor/generator with collector.

* * * * *

UNITED STATES PATENT AND TRADEMARK OFFICE
CERTIFICATE OF CORRECTION

PATENT NO. : 4,754,940
DATED : July 5, 1988
INVENTOR(S) : BURKHARD DETER

It is certified that error appears in the above-identified patent and that said Letters Patent is hereby corrected as shown below:

```
In Column 1, line 66, change "...via a hydraulic drive..."
  to read --...via a hydrazine drive...--

In Column 2, line 5,  change "...engine-indepedent..."
  to read --...engine-independent...--

In Column 6, line 40, change "...enabling them..."
  to read --...enabling them to be...--
```

Signed and Sealed this

Sixth Day of December, 1988

*Attest:*

DONALD J. QUIGG

*Attesting Officer*  *Commissioner of Patents and Trademarks*